US012360591B2

(12) United States Patent
Singh (10) Patent No.: US 12,360,591 B2
(45) Date of Patent: Jul. 15, 2025

(54) INTELLIGENT ROBOTIC PROCESS AUTOMATION BOT DEVELOPMENT USING CONVOLUTIONAL NEURAL NETWORKS

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 680 days.

(21) Appl. No.: 17/372,060

(22) Filed: Jul. 9, 2021

(65) Prior Publication Data

US 2023/0008220 A1 Jan. 12, 2023

(51) Int. Cl.
*G06F 3/01* (2006.01)
*G06F 40/40* (2020.01)
*G06N 3/08* (2023.01)

(52) U.S. Cl.
CPC .............. *G06F 3/013* (2013.01); *G06F 40/40* (2020.01); *G06N 3/08* (2013.01)

(58) Field of Classification Search
None
See application file for complete search history.

(56) References Cited

U.S. PATENT DOCUMENTS 7,561,143 B1 * 7/2009 Milekic ................... G06F 3/013 345/32
9,256,785 B2 * 2/2016 Qvarfordt ................. G06T 7/74
9,952,672 B2 * 4/2018 Björklund ............... G06F 3/013
10,121,063 B2 * 11/2018 von und zu Liechtenstein ........... G06F 3/0236
10,528,131 B2 * 1/2020 Davies ..................... G06F 3/013
11,307,665 B2 * 4/2022 von und zu Liechtenstein ........... G06F 3/0485

(Continued)

FOREIGN PATENT DOCUMENTS

EP             3112965 A1 *  1/2017 .............. B25J 9/163
WO        WO-0233545 A2 *  4/2002 .............. G06F 9/548
WO    WO-2023097016 A2 *  6/2023 ........... G01R 21/133

OTHER PUBLICATIONS

'Towards a Method for Automated Testing in Robotic Process Automation Projects' by Chacon-Montero et al., 2019. (Year: 2019).*

(Continued)

*Primary Examiner* — Steven G Snyder
(74) *Attorney, Agent, or Firm* — Banner & Witcoff, Ltd.

(57) ABSTRACT

Aspects of the disclosure relate to intelligent RPA bot development. A computing platform may identify user interface field information from one or more applications based on tracking eye movements of the user. The computing platform may identify device events associated with the eye movements of the user. The computing platform may generate a sequence log associating the eye movements of the user with the device events. The computing platform may derive, using a machine learning model, based on the sequence log, a cognitive model of the transaction by the user. The computing platform may generate a workflow for an autonomous bot by identifying and assembling robotic process automation components based on the derived cognitive model of the transaction by the user. The computing platform may send the workflow for the autonomous bot to a user computing device.

17 Claims, 10 Drawing Sheets

(56) References Cited

U.S. PATENT DOCUMENTS

| | | | |
|---|---|---|---|
| 2002/0078255 A1* | 6/2002 | Narayan | H04L 69/329 719/330 |
| 2003/0046254 A1* | 3/2003 | Ryu | G06F 3/015 706/15 |
| 2015/0131850 A1* | 5/2015 | Qvarfordt | G06T 7/74 382/103 |
| 2016/0203359 A1* | 7/2016 | von und zu Liechtenstein | G06V 40/19 345/156 |
| 2017/0068316 A1* | 3/2017 | Seok | G06F 3/0237 |
| 2017/0206431 A1 | 7/2017 | Sun et al. | |
| 2018/0210235 A1* | 7/2018 | Boss | G02C 11/10 |
| 2019/0102676 A1 | 4/2019 | Nazari et al. | |
| 2019/0180746 A1* | 6/2019 | Diwan | G06F 16/252 |
| 2019/0205636 A1 | 7/2019 | Saraswat et al. | |
| 2019/0244149 A1 | 8/2019 | Krishnaswamy | |
| 2019/0324781 A1 | 10/2019 | Ramamurthy et al. | |
| 2019/0340627 A1 | 11/2019 | Cella | |
| 2019/0354172 A1* | 11/2019 | Davies | G06F 3/013 |
| 2020/0133816 A1 | 4/2020 | Soni et al. | |
| 2020/0134374 A1 | 4/2020 | Oros | |
| 2020/0147791 A1 | 5/2020 | Safary et al. | |
| 2020/0348662 A1 | 11/2020 | Cella et al. | |
| 2020/0387966 A1 | 12/2020 | Cella | |
| 2020/0394708 A1 | 12/2020 | Cella | |
| 2021/0027774 A1 | 1/2021 | Kessler et al. | |
| 2021/0103645 A1 | 4/2021 | Iordache et al. | |
| 2021/0109503 A1 | 4/2021 | Singh et al. | |
| 2021/0109847 A1 | 4/2021 | Jaganmohan et al. | |
| 2021/0110256 A1 | 4/2021 | Singh et al. | |
| 2021/0110345 A1 | 4/2021 | Iyer et al. | |
| 2021/0144110 A1 | 5/2021 | Tseng et al. | |
| 2021/0157312 A1 | 5/2021 | Cella et al. | |
| 2021/0158268 A1* | 5/2021 | Berg | G06F 9/451 |
| 2021/0166093 A1 | 6/2021 | Laza et al. | |
| 2021/0191367 A1 | 6/2021 | Iyer et al. | |
| 2021/0191843 A1 | 6/2021 | Stocker et al. | |
| 2021/0192412 A1 | 6/2021 | Krishnaswamy | |
| 2021/0209449 A1 | 7/2021 | Neagovici et al. | |
| 2021/0333882 A1* | 10/2021 | von und zu Liechtenstein | G06F 3/015 |

OTHER PUBLICATIONS

'Robotic Process Automation' by Peter Hofmann et al., Published online: Nov. 4, 2019. (Year: 2019).*

'Automated Robotic Process Automation: A Self-Learning Approach' by Junxiong Gao et al., copyright 2019. (Year: 2019).*

'Model View Controller Explained' by Tom Dalling, May 31, 2009. (Year: 2009).*

'Conceptual Understanding of Convolutional Neural Network—A Deep Learning Approach' by Sakshi Indolia et al., International Conference on Computational Intelligence and Data Science (ICCIDS 2018). (Year: 2018).*

'Integrating Click-Through and Eye-Tracking Logs for Decision-Making Process Mining' by Razvan Petrusel, 2014. (Year: 2014).*

He, Machine Translation of Chinese Patent Application CN 111580674 A, 2020. (Year: 2020).*

Xie, Machine Translation of Chinese Patent Application CN 115205955 A, 2022. (Year: 2022).*

Ritter, Machine Translation of European Patent Application EP 1603011 A1, 2004. (Year: 2004).*

'Event[0] + Eye Tracking' by Tobii Gaming, copyright 2016-2024. (Year: 2016).*

'Evaluation of interactive data visualization tools based on gaze and mouse tracking' by Chiu-Fang Peng et al., 2016 IEEE International Symposium on Multimedia. (Year: 2016).*

* cited by examiner

INTELLIGENT ROBOTIC PROCESS AUTOMATION BOT DEVELOPMENT USING CONVOLUTIONAL NEURAL NETWORKS

BACKGROUND

Aspects of the disclosure generally relate to one or more computer systems, servers, and/or other devices including hardware and/or software. In particular, one or more aspects of the disclosure relate to intelligent robotic process automation (RPA) bot development using convolutional neural networks.

Robotic process automation products may be used to automate transactions. Typically, data is extracted from a presentation layer of source applications. Further, existing systems rely on user defined requirements for developing RPA bots. Such requirement gathering may be complex and resource intensive. In many instances, it may be difficult to automatically create an RPA bot while a user is processing a transaction in real time.

SUMMARY

Aspects of the disclosure provide effective, efficient, scalable, and convenient technical solutions that address and overcome the technical problems associated with robotic process automation (RPA) bot development and deployment. In particular, one or more aspects of the disclosure allow a system to provide intelligent autonomous cognitive RPA bot creating leveraging convolutional neural networks and eye tracking. Additional aspects of the disclosure may provide an intelligent RPA bot development computing platform for intelligently learning the nature of a transaction and developing a cognitive understanding of the transaction. Additional aspects of the disclosure may integrate eye tracking and associated device events to construct an RPA bot (e.g., that may mimic human interaction on the user interface layer of an application). Further aspects of the disclosure may identify user interface field information from a source application using eye tracking and link information to an RPA bot.

In accordance with one or more embodiments, a computing platform having at least one processor, a communication interface, and memory may, during a transaction by a user, identify user interface field information from one or more applications based on tracking eye movements of the user. Subsequently, the computing platform may identify device events associated with the eye movements of the user. Next, the computing platform may generate a sequence log associating the eye movements of the user with the device events. Thereafter, the computing platform may derive, using a machine learning model, based on the sequence log, a cognitive model of the transaction by the user. The computing platform may generate a workflow for an autonomous bot by identifying and assembling robotic process automation components based on the derived cognitive model of the transaction by the user. The computing platform may send the workflow for the autonomous bot to a user computing device.

In some embodiments, generating the sequence log associating the eye movements of the user with the device events may include mapping, based on a model-viewer-controller (MVC) architecture, user interface fields viewed by the user with device events associated with the user interface fields viewed by the user.

In some arrangements, identifying user interface field information from one or more applications based on tracking eye movements of the user may include tracking eye movements of the user using smart contact lenses or smart glasses.

In some examples, the machine learning model may include one or more of: a generative adversarial network (GAN), a convolutional neural network, or a long short-term memory network.

In some embodiments, deriving the cognitive model of the transaction by the user may include using convolutional neural networks for eye tracking.

In some example arrangements, identifying the user interface field information from the one or more applications may include processing information from more than one graphical user interface screen.

In some embodiments, identifying the device events associated with the eye movements of the user may include processing information from more than one graphical user interface screen.

In some examples, identifying the device events associated with the eye movements of the user may include identifying, during a period of time, one or more of: a copying action, a scrolling action, a selecting action, a clicking action, or a typing action.

In some embodiments, identifying the device events associated with the eye movements of the user may include identifying keyboard or mouse device actions.

In some embodiments, deriving the cognitive model of the transaction by the user may include determining reasons for extraction of information from one or more user interface fields and how the extracted information from the one or more user interface fields is used by the user.

In some embodiments, deriving the cognitive model of the transaction by the user may include natural language processing of content on a graphical user interface screen.

In some arrangements, the workflow for the autonomous bot may be validated and deployed in a test environment.

In some examples, the computing platform may receive a modification request from the user specifying one or more modifications to the workflow for the autonomous bot, and modify the workflow for the autonomous bot based on the modification request.

In some arrangements, modifying the workflow for the autonomous bot based on the modification request may include reassembling the robotic process automation components based on the derived cognitive model of the transaction by the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
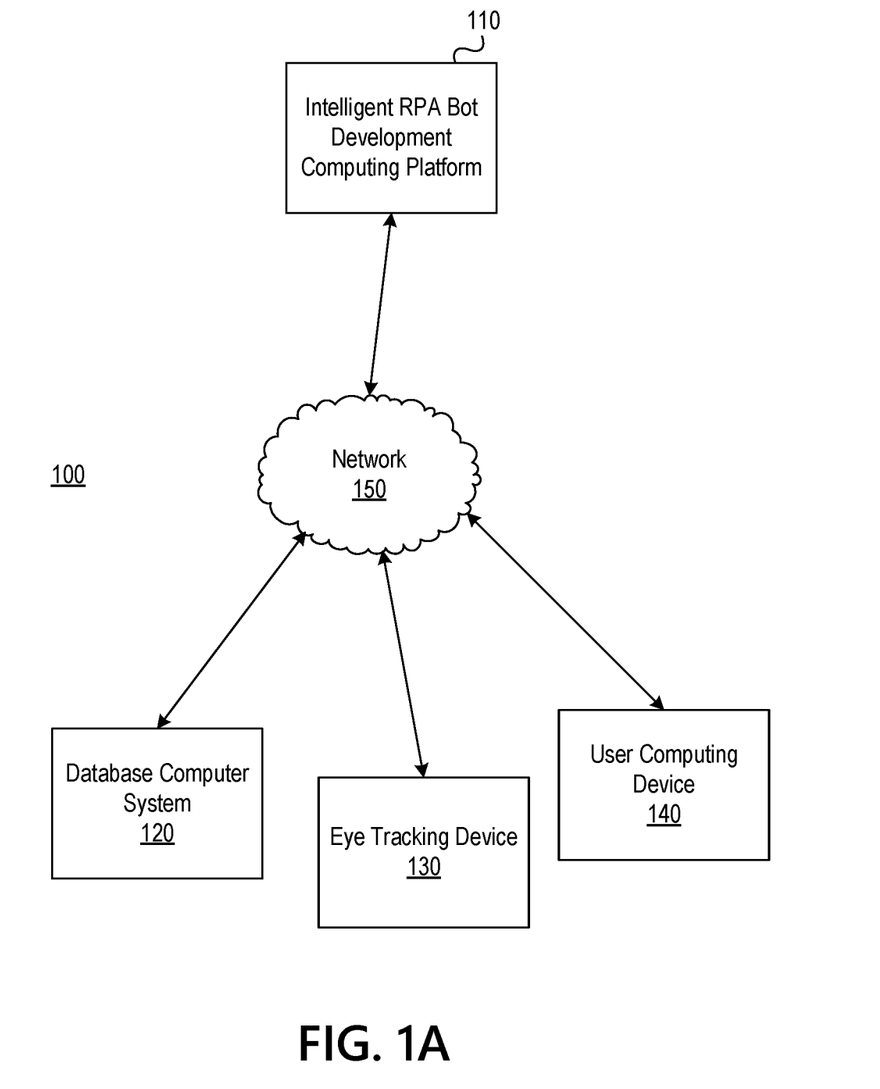
FIGS. 1A and 1B depict an illustrative computing environment for intelligent RPA bot development in accordance with one or more example embodiments.
Figure 1B:
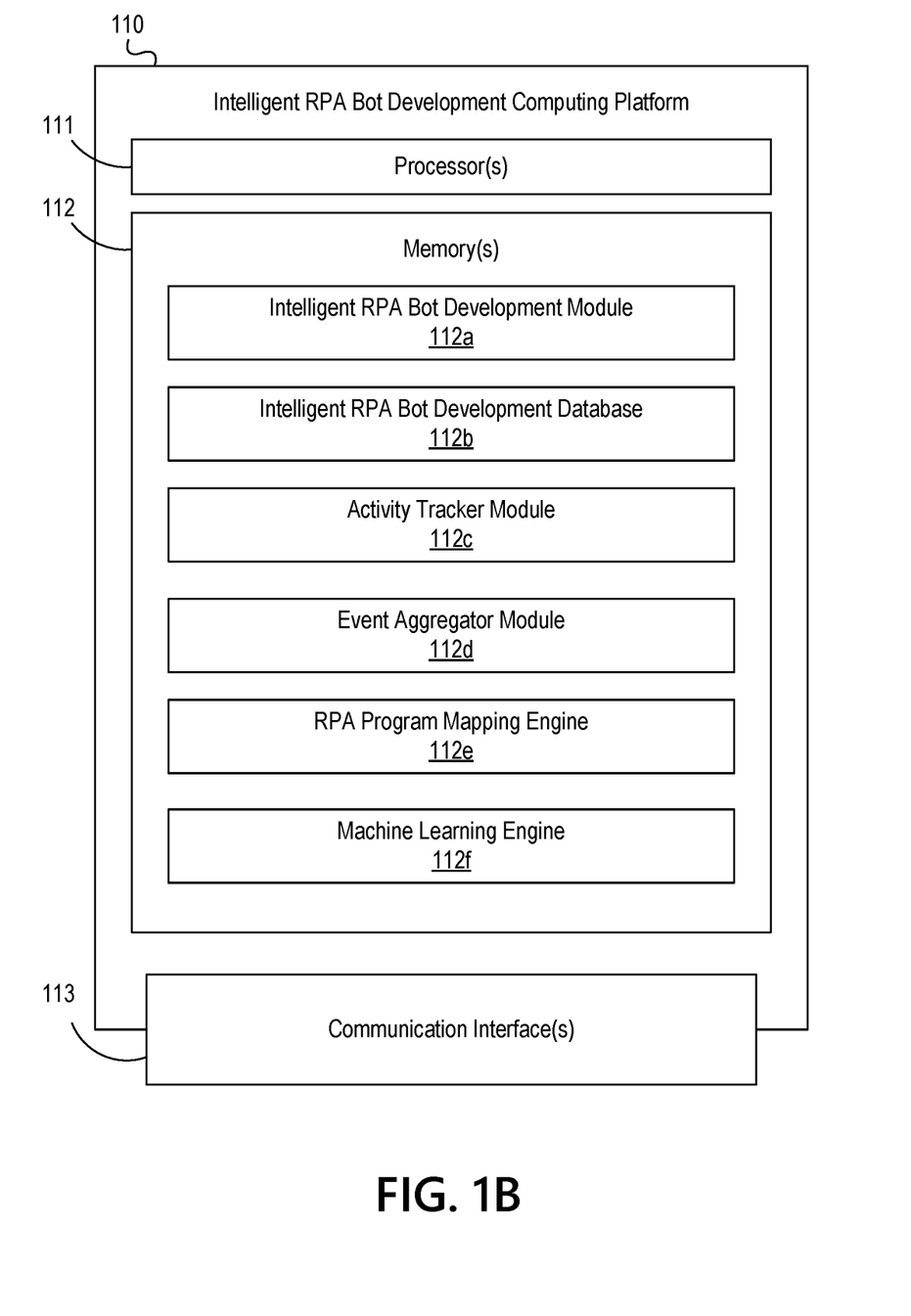

FIGS. 1A and 1B depict an illustrative computing environment for intelligent RPA bot development in accordance with one or more example embodiments. Referring to FIG. 1A, computing environment 100 may include one or more computing devices and/or other computing systems. For example, computing environment 100 may include intelligent RPA bot development computing platform 110, database computer system 120, eye tracking device 130, and user computing device 140. Although one user computing device 140 is shown for illustrative purposes, any number of user computing devices may be used without departing from the disclosure.

As illustrated in greater detail below, intelligent RPA bot development computing platform 110 may include one or more computing devices configured to perform one or more of the functions described herein. For example, intelligent RPA bot development computing platform 110 may include one or more computers (e.g., laptop computers, desktop computers, servers, server blades, or the like).

Database computer system 120 may include different information storage entities storing application information, user interface information (e.g., user interface field information), sequence logs (e.g. event-interaction logs including eye tracking and device events), and/or other information associated with intelligent RPA bot development.

Eye tracking device 130 may include one or more cameras (e.g., an infrared camera) for tracking the movements or the gaze of at least one eye (e.g., the pupil) of a user (e.g., when the user is looking on a computer screen). For example, measurements may be carried out by eye tracking device 130 that records the position of the eye or eyes and the movements they make. Eye tracking device 130 may be and/or include head mounted display. In some examples, eye tracking device 130 may include smart glasses, smart contact lenses, an augmented reality device, or the like, for which a camera captures (e.g., in real-time) visual information (e.g., where a person is looking).

User computing device 140 may include one or more computing devices and/or other computer components (e.g., processors, memories, communication interfaces). For instance, user computing device 140 may be a server, desktop computer, laptop computer, tablet, mobile device, or the like, and may be used by a software developer, or the like. In addition, user computing device 140 may be associated with an enterprise organization operating intelligent RPA bot development computing platform 110.

Computing environment 100 also may include one or more networks, which may interconnect one or more of intelligent RPA bot development computing platform 110, database computer system 120, eye tracking device 130, and user computing device 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, intelligent RPA bot development computing platform 110 and database computer system 120 may be associated with an organization (e.g., a financial institution), and network 150 may be associated with and/or operated by the organization, and may include one or more networks (e.g., LANs, WANs, virtual private networks (VPNs), or the like) that interconnect intelligent RPA bot development computing platform 110, database computer system 120, eye tracking device 130, and user computing device 140. Network 150 also may include a public sub-network that may connect the private sub-network and/or one or more computing devices connected thereto (e.g., eye tracking device 130, user computing device 140) with one or more networks and/or computing devices that are not associated with the organization.

In one or more arrangements, intelligent RPA bot development computing platform 110, database computer system 120, eye tracking device 130, and user computing device 140 may be any type of computing device capable of receiving a user interface, receiving input via the user interface, and communicating the received input to one or more other computing devices. For example, intelligent RPA bot development computing platform 110, database computer system 120, eye tracking device 130, and user computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, intelligent RPA bot development computing platform 110 may include one or more processor(s) 111, memory(s) 112, and communication interface(s) 113. A data bus may interconnect processor 111, memory 112, and communication interface 113. Communication interface 113 may be a network interface configured to support communication between intelligent RPA bot development computing platform 110 and one or more networks (e.g., network 150 or the like). Memory 112 may include one or more program modules having instructions that when executed by processor 111 cause intelligent RPA bot development computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of intelligent RPA bot development computing platform 110 and/or by different computing devices that may form and/or otherwise make up intelligent RPA bot development computing platform 110. For example, memory 112 may have, store, and/or include an intelligent RPA bot development module 112a, an intelligent RPA bot development database 112b, an activity tracker module 112c, an event aggregator module 112d, an RPA program mapping engine 112e, and a machine learning engine 112f. Intelligent RPA bot development module 112a may have instructions that direct and/or cause intelligent RPA bot development computing platform 110 to intelligently and automatically generate a workflow for an RPA product (e.g., an RPA bot) and/or perform other functions, as discussed in greater detail below. Intelligent RPA bot development database 112b may store information used by intelligent RPA bot development module 112a and/or intelligent RPA bot development computing platform 110 in developing an intelligent autonomous cognitive RPA bot and/or in performing other functions. Activity tracker module 112c may track device actions (e.g., actions of a keyboard, mouse, stylus, or the like) associated with eye movement. Event aggregator module 112d may have instructions that direct and/or cause intelligent RPA bot development computing platform 110 to capture or register (e.g., in real-time) events such as eye movement and device events associated with user interface fields corresponding to one or more applications (e.g., logged over time). RPA program mapping engine 112e may have instructions that direct and/or cause intelligent RPA bot development computing platform 110 to identify and assemble RPA components (e.g., generate workflows) used by intelligent RPA bot development computing platform 110 and/or other systems in computing environment 100 in performing intelligent RPA bot development. Machine learning engine 112f may have instructions that direct and/or cause intelligent RPA bot development computing platform 110 to set, define, and/or iteratively redefine rules, techniques and/or other parameters used by intelligent RPA bot development computing platform 110 and/or other systems in computing environment 100 in performing intelligent RPA bot development.

Figure 2A:
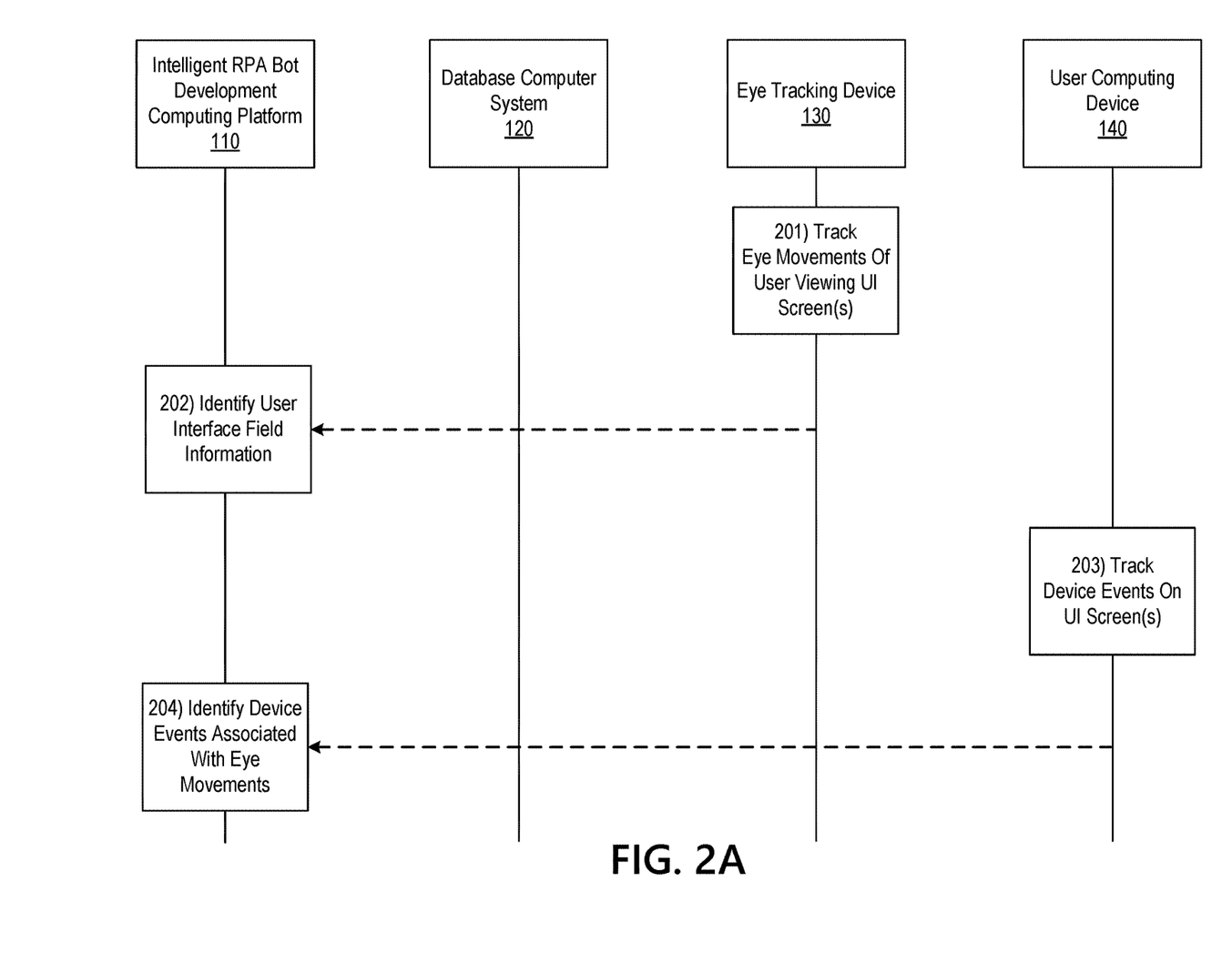
FIGS. 2A-2D depict an illustrative event sequence for intelligent RPA bot development in accordance with one or more example embodiments.

FIGS. 2A-2D depict an illustrative event sequence for an intelligent RPA bot development in accordance with one or more example embodiments. Referring to FIG. 2A, at step 201, an eye tracking device (e.g., eye tracking device 130) may track eye movements of a user (e.g., viewing one or more user interface (UI) screens associated with one or more applications).

At step 202, based on tracking the eye movements of the user, intelligent RPA bot development computing platform 110 may identify user interface field information (e.g., from one or more user interface (UI) screens associated with one or more applications). For example, intelligent RPA bot development computing platform 110 may track eye movements of the user using smart contact lenses, smart glasses, or other eye tracking device.

At step 203, a user computing device (e.g., user computing device 140) may track device events (e.g., on the one or more UI screens viewed by the user). In identifying the device events associated with the eye movements of the user, intelligent RPA bot development computing platform 110 may process information from more than one graphical user interface screen.

Figure 4:
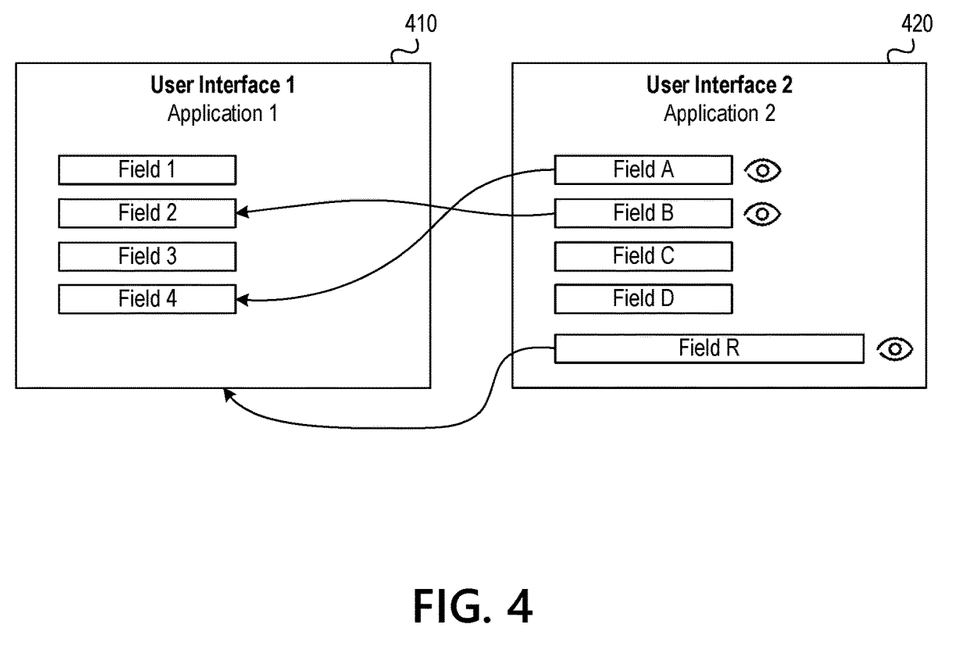

At step 204, intelligent RPA bot development computing platform 110 (e.g., via activity tracker module 112c and/or event aggregator module 112d) may identify device events associated with the eye movements of the user. For instance, as illustrated in FIG. 4, intelligent RPA bot development computing platform 110 may monitor a user's interactions with one or more applications (e.g., a first UI screen/application 410 and a second UI screen/application 420) and capture information for a transaction (e.g., eye movement and device events) based on tasks performed on a user interface screen. For example, intelligent RPA bot development computing platform 110 may identify, during a period of time, one or more of: a copying action, a scrolling action, a selecting action, a clicking action, or a typing action associated with a keyboard or mouse device. For instance, as illustrated in FIG. 4, a user may view "Field A" (e.g., of UI screen 420), select and copy information from "Field A," click into "Field 4" (e.g. of UI screen 410), and paste the information from "Field A" to "Field 4". Additionally or alternatively, as illustrated in FIG. 4, a user may view "Field B" (e.g., of UI screen 420), select and copy information from "Field B," click into "Field 2" (e.g. of UI screen 410), and paste the information from "Field B" to "Field 2." Additionally or alternatively, as illustrated in FIG. 4, a user may view "Field R" (e.g., a "Remarks" section of UI screen 420), and based on information in "Field R," the user may view and/or infer information from UI screen 410.

In some examples, intelligent RPA bot development computing platform 110 may implement natural language processing (NLP) for information extraction or retrieval, or the like (e.g., read or understand content in a "Remarks" section of a graphical user interface screen).

Figure 2B:
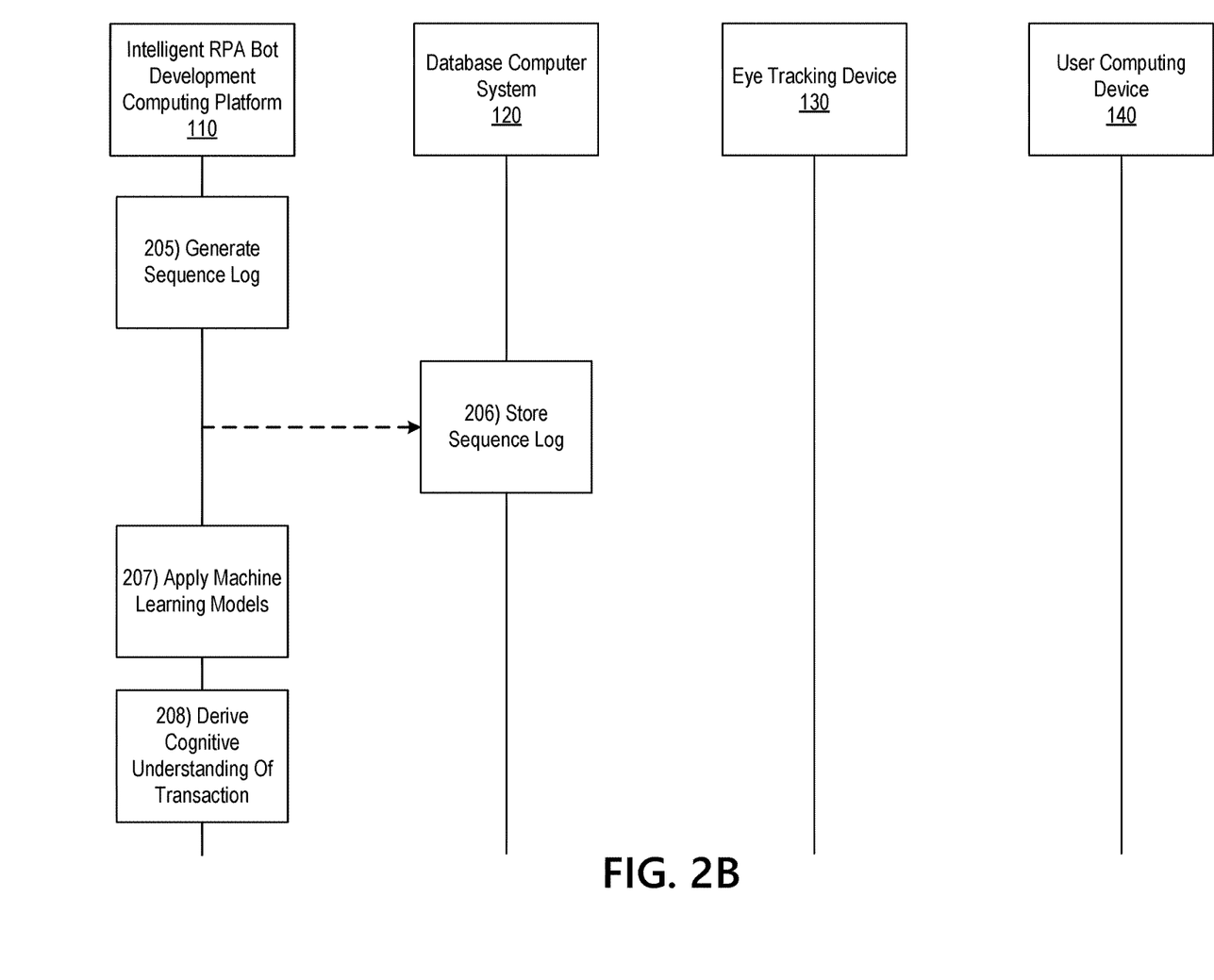
Figure 3:
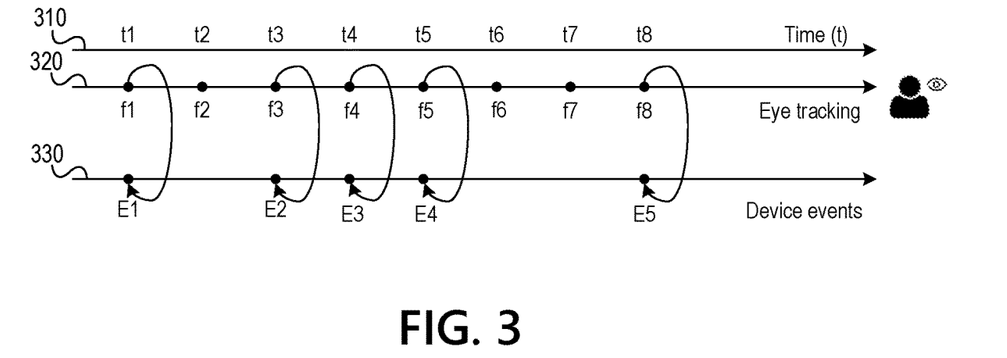
FIGS. 3-5 depict example graphical user interfaces for intelligent RPA bot development in accordance with one or more example embodiments.

Referring to FIG. 2B, at step 205, intelligent RPA bot development computing platform 110 may generate a sequence log (e.g., an event-interaction sequence log) associating the eye movements of the user with the device events. In generating the sequence log associating the eye movements of the user with the device events, intelligent RPA bot development computing platform 110 may map user interface fields viewed by the user with device events associated with the user interface fields viewed by the user based on a model-viewer-controller (MVC) architecture. For example, a schematic diagram of an event-interaction sequence log is illustrated in FIG. 3. As seen in FIG. 3, the sequence log may register or track time information 310 (e.g., t1, t2, t3, . . . ), field information 320 based on eye tracking (e.g., f1, f2, f3, . . . ), and device event information 330 (e.g., E1, E2, E3, . . . ). Additionally or alternatively, the sequence log may register or track application information (e.g., corresponding to one or more applications) or UI information (e.g., corresponding to one or more UI screens) linked to the field information. In addition, as shown in FIG. 3, eye tracking on field f1 may be associated with device event E1, eye tracking on field f3 may be associated with device event E2, eye tracking on field f4 may be associated with device event E3, eye tracking on field f5 may be associated with device event E4, and eye tracking on field f8 may be associated with device event E6. Intelligent RPA bot development computing platform 110 may use such information (e.g., time information 310, field information 320, device event information 330) to develop a cognitive understanding of the transaction by the user (e.g., learn the nature of the transaction by the user).

At step 206, intelligent RPA bot development computing platform 110 may store the sequence log in at least one database (e.g., database computer system 120), which may be maintained by the computing platform or any of the devices described herein.

At step 207, intelligent RPA bot development computing platform 110 may (e.g., via machine learning engine 112f) apply machine learning models (e.g., deep learning models) to the data (e.g., stored in database computer system 120). In turn, at step 208, intelligent RPA bot development computing platform 110 may derive a cognitive model (e.g., a contextual understanding) of the transaction by the user. In deriving the cognitive model of the transaction by the user, intelligent RPA bot development computing platform 110 may determine reasons for extraction of information from one or more user interface fields (e.g., establish a cognitive understanding of why a user has extracted certain information) and how the extracted information from the one or more user interface fields is used by the user. In some examples, the machine learning model may include one or more of: a generative adversarial network (GAN), a convolutional neural network, or a long short-term (LSTM)

memory neural network. In deriving the cognitive model of the transaction by the user, intelligent RPA bot development computing platform 110 may using convolutional neural networks for eye tracking.

Figure 2C:
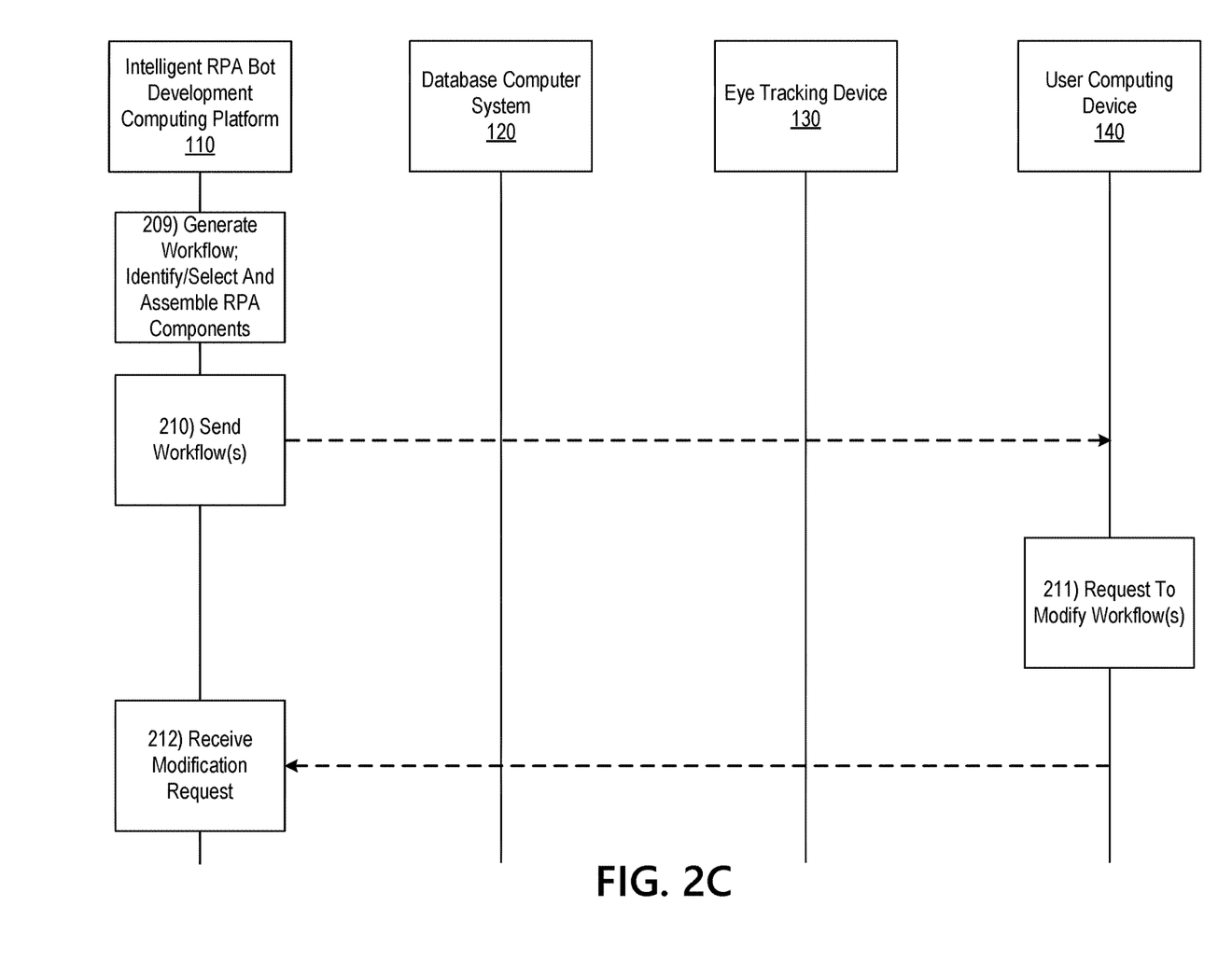

Referring to FIG. 2C, at step 209, intelligent RPA bot development computing platform 110 may (e.g., via RPA program mapping engine 112e) generate or develop a workflow for an autonomous bot by identifying and assembling robotic process automation components based on the derived cognitive model of the transaction by the user. For example, an RPA bot workflow may be built using ready and custom components (and linkages or connectors) for performing a set of actions to automate multiple steps in a flow.

Figure 5:
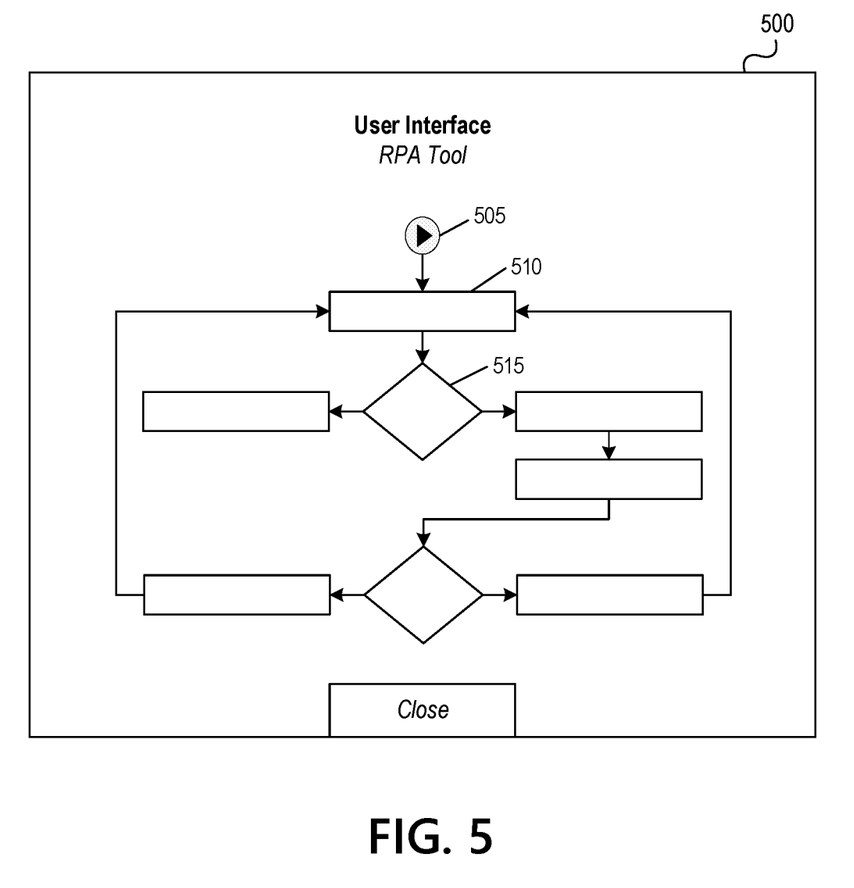

At step 210, intelligent RPA bot development computing platform 110 may send, via the communication interface (e.g., communication interface 113), the workflow for the autonomous bot to a user computing device (e.g., user computing device 140). In some examples, the RPA bot may be a prototype which may be further refined by a user. In other examples, the RPA bot may be a fully functional bot (e.g., ready for deployment), which may be tested, and if meeting requirements (e.g., of an organization), may be automatically deployed without human interaction (e.g., without requirement gathering). For example, intelligent RPA bot development computing platform 110 may cause the user computing device (e.g., user computing device 140) to display and/or otherwise present one or more graphical user interfaces similar to graphical user interface 500, which is illustrated in FIG. 5. As seen in FIG. 5, graphical user interface 500 may include text and/or other information associated with an RPA workflow (e.g., an initial RPA workflow or flowchart, as shown), including RPA components 505, 510, and 515, for example. It will be appreciated that other and/or different notifications may also be provided.

In some embodiments, at step 211, the user computing device (e.g., user computing device 140) may receive, via the communication interface (e.g., communication interface 113), a modification request from the user of the user computing device (e.g., user computing device 140) specifying one or more modifications to the workflow for the autonomous bot. At step 212, intelligent RPA bot development computing platform 110 may receive the modification request from the user of the user computing device (e.g., user computing device 140).

Figure 2D:
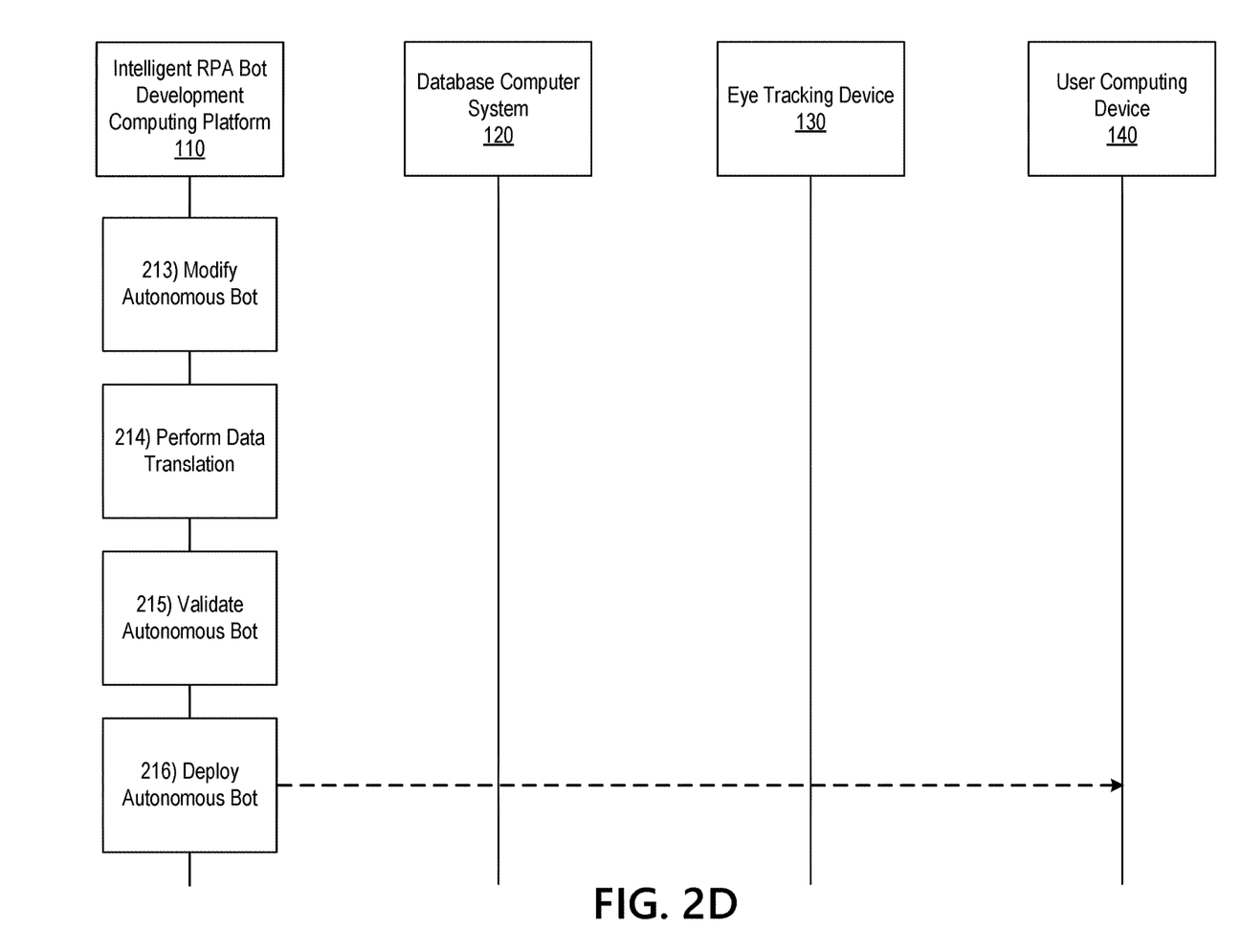

Referring to FIG. 2D, at step 213, intelligent RPA bot development computing platform 110 may modify the workflow for the autonomous bot based on the modification request. For example, in modifying the workflow for the autonomous bot, intelligent RPA bot development computing platform 110 may reassemble the robotic process automation components based on the derived cognitive model of the transaction by the user.

At step 214, intelligent RPA bot development computing platform 110 may perform data translation. For example, a data translation layer may translate data to a target data type as appropriate or desired.

At step 215, intelligent RPA bot development computing platform 110 may validate the workflow for the autonomous bot. At step 216, intelligent RPA bot development computing platform 110 may deploy the workflow for the autonomous bot in a test or production environment (e.g., on user computing device 140). In a case where the workflow for the autonomous bot fails validation, intelligent RPA bot development computing platform 110 may iteratively remap the robotic process automation components until a predetermined accuracy threshold is satisfied. In some examples, the predetermined accuracy threshold may be based on a complexity of a transaction or task.

Figure 6:
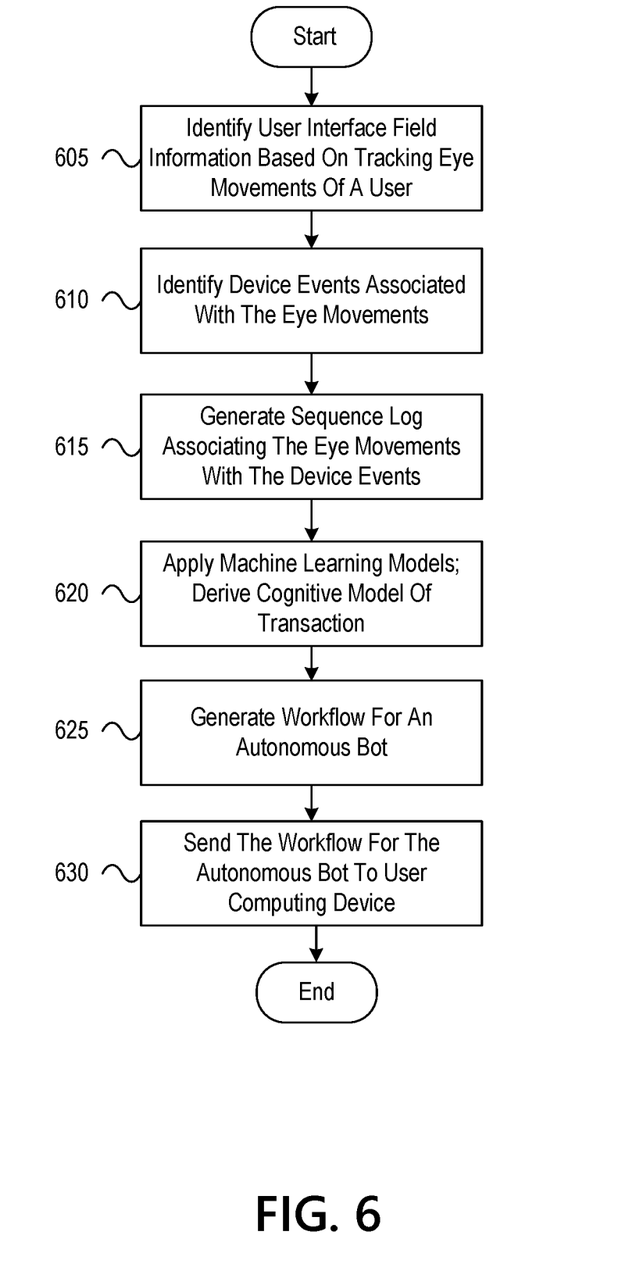
FIG. 6 depicts an illustrative method for intelligent RPA bot development in accordance with one or more example embodiments.

FIG. 6 depicts an illustrative method for intelligent RPA bot development in accordance with one or more example embodiments. Referring to FIG. 6, at step 605, a computing platform having at least one processor, a communication interface, and memory may, during a transaction by a user, identify user interface field information from one or more applications based on tracking eye movements of the user. At step 610, the computing platform may identify device events associated with the eye movements of the user. At step 615, the computing platform may generate a sequence log associating the eye movements of the user with the device events. At step 620, the computing platform may derive, using a machine learning model, based on the sequence log, a cognitive model of the transaction by the user. At step 625, the computing platform may generate a workflow for an autonomous bot by identifying and assembling robotic process automation components based on the derived cognitive model of the transaction by the user. At step 630, the computing platform may send the workflow for the autonomous bot to a user computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor;
    a communication interface communicatively coupled to the at least one processor; and
    memory storing computer-readable instructions that, when executed by the at least one processor, cause the computing platform to, during a transaction by a user:
        identify user interface field information from user interfaces associated with one or more applications based on tracking eye movements of the user;
        extract information from one or more user interface fields of the user interfaces including identifying device events associated with the eye movements of the user, wherein identifying the device events associated with the eye movements of the user comprises identifying keyboard or mouse device actions performed by the user and corresponding to the eye movements of the user and using natural language processing to extract information from the one or more user interface fields of the user interfaces;
        generate a sequence log associating the eye movements of the user with the device events performed by the user;
        derive, using a machine learning model, based on the sequence log, a cognitive model of a transaction by the user associated with the device events, wherein the deriving the cognitive model includes determining reasons for the extracting the information from the one or more user interface fields of the user interfaces and identifying how the extracted information is used by the user;
        generate a workflow for an autonomous bot by identifying and assembling robotic process automation components based on the derived cognitive model of the transaction by the user; and
        send, via the communication interface, the workflow for the autonomous bot to a user computing device.

2. The computing platform of claim 1, wherein generating the sequence log associating the eye movements of the user with the device events comprises mapping, based on a model-viewer-controller (MVC) architecture, user interface fields, of the user interfaces, viewed by the user with device events performed by the user and associated with the user interface fields viewed by the user.

3. The computing platform of claim 1, wherein identifying the user interface field information from the user interfaces associated with one or more applications based on tracking eye movements of the user comprises tracking eye movements of the user using smart contact lenses or smart glasses.

4. The computing platform of claim 1, wherein the machine learning model comprises one or more of: a generative adversarial network (GAN), a convolutional neural network, or a long short-term memory network.

5. The computing platform of claim 1, wherein deriving the cognitive model of the transaction by the user further comprises using convolutional neural networks for eye tracking.

6. The computing platform of claim 1, wherein identifying the user interface field information from the user interfaces associated with the one or more applications comprises processing information from more than one graphical user interface screen.

7. The computing platform of claim 1, wherein identifying the device events performed by the user and associated with the eye movements of the user comprises processing information from more than one graphical user interface screen.

8. The computing platform of claim 1, wherein identifying the device events associated with the eye movements of the user comprises identifying, during a period of time, one or more of: a copying action, a scrolling action, a selecting action, a clicking action, or a typing action.

9. The computing platform of claim 1, wherein deriving the cognitive model of the transaction by the user further comprises natural language processing of content on a graphical user interface screen.

10. The computing platform of claim 1, wherein the memory stores additional computer-readable instructions that, when executed by the at least one processor, cause the computing platform to:
    validate the workflow for the autonomous bot; and
    deploy the workflow for the autonomous bot in a test environment.

11. The computing platform of claim 1, wherein the memory stores additional computer-readable instructions that, when executed by the at least one processor, cause the computing platform to:
    receive, via the communication interface, a modification request from the user specifying one or more modifications to the workflow for the autonomous bot; and
    modify the workflow for the autonomous bot based on the modification request.

12. The computing platform of claim 11, wherein modifying the workflow for the autonomous bot based on the modification request comprises reassembling the robotic process automation components based on the derived cognitive model of the transaction by the user.

13. A method, comprising:
    at a computing platform comprising at least one processor, a communication interface, and memory, during a transaction by a user:
        identifying, by the at least one processor, user interface field information from user interfaces associated with one or more applications based on tracking eye movements of the user;

extracting information from one or more user interface fields of the user interfaces including identifying, by the at least one processor, device events associated with the eye movements of the user, wherein identifying the device events associated with the eye movements of the user comprises identifying keyboard or mouse device actions performed by the user and corresponding to the eye movements of the user and using natural language processing to extract information from the one or more user interface fields of the user interfaces;

generating, by the at least one processor, a sequence log associating the eye movements of the user with the device events performed by the user;

deriving, by the at least one processor, using a machine learning model, based on the sequence log, a cognitive model of a transaction by the user associated with the device events, wherein the deriving the cognitive model includes determining reasons for the extracting the information from the one or more user interface fields of the user interfaces and identifying how the extracted information is used by the user;

generating, by the at least one processor, a workflow for an autonomous bot by identifying and assembling robotic process automation components based on the derived cognitive model of the transaction by the user; and sending, by the at least one processor, via the communication interface, the workflow for the autonomous bot to a user computing device.

14. The method of claim 13, wherein generating the sequence log associating the eye movements of the user with the device events comprises mapping, based on a model-viewer-controller (MVC) architecture, user interface fields, of the user interfaces, viewed by the user with device events performed by the user and associated with the user interface fields viewed by the user.

15. The method of claim 13, wherein the machine learning model comprises one or more of: a generative adversarial network (GAN), a convolutional neural network, or a long short-term memory network.

16. The method of claim 13, wherein deriving the cognitive model of the transaction by the user further comprises using convolutional neural networks for eye tracking.

17. One or more non-transitory computer-readable media storing instructions that, when executed by a computing platform comprising at least one processor, a communication interface, and memory, cause the computing platform to, during a transaction by a user:

identify user interface field information from user interfaces associated with one or more applications based on tracking eye movements of the user;

extract information from one or more user interface fields of the user interfaces including identifying device events associated with the eye movements of the user, wherein identifying the device events associated with the eye movements of the user comprises identifying keyboard or mouse device actions performed by the user and corresponding to the eye movements of the user and using natural language processing to extract information from the one or more user interface fields of the user interfaces;

generate a sequence log associating the eye movements of the user with the device events performed by the user;

derive, using a machine learning model, based on the sequence log, a cognitive model of a transaction by the user associated with the device events, wherein the deriving the cognitive model includes determining reasons for the extracting the information from the one or more user interface fields of the user interfaces and identifying how the extracted information is used by the user;

generate a workflow for an autonomous bot by identifying and assembling robotic process automation components based on the derived cognitive model of the transaction by the user; and send, via the communication interface, the workflow for the autonomous bot to a user computing device.

* * * * *